3,823,155
IMIDAZOLINE DERIVATIVES WITH DIURETIC PROPERTIES

Cornelis van der Stelt, Haarlem, Netherlands, assignor to Gist-Brocades N.V., Delft, Netherlands
No Drawing. Filed Dec. 20, 1971, Ser. No. 210,210
Int. Cl. C07d 49/34
U.S. Cl. 260—309.6     3 Claims

ABSTRACT OF THE DISCLOSURE

Imidazoline derivatives are disclosed which carry on the 1-position, a substituted or unsubstituted bis(phenyl)methyl, 5H-dibenzocyclohepten-5-yl or 10,11-dihydro-5H-dibenzocyclohepten-5-yl substituent. The compounds have diuretic activity.

---

The invention relates to new, therapeutically useful imidazoline derivatives and their acid addition and quaternary ammonium salts, to processes for their preparation and pharmaceutical preparations containing them.

The new imidazoline derivatives of the invention are compounds of the formula

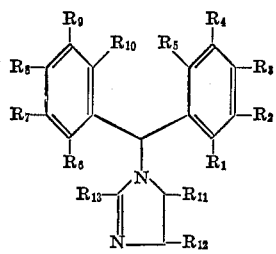

I wherein the symbols $R_1$–$R_{10}$ are the same or different and each represents a hydrogen or halogen atom or a lower alkyl or lower alkoxy group and $R_5$ and $R_{10}$ may together also form a —$CH_2$—$CH_2$—, —CH=CHal— (wherein Hal represents a chlorine or bromine atom) or —CH=CH— bridge between the phenyl nuclei and $R_{11}$, $R_{12}$ and $R_{13}$ are the same or different and each represents a hydrogen atom or an alkyl group with at most 12 carbon atoms. The terms "lower alkyl" and "lower alkoxy" in this specification and accompanying claims mean straight- or branched-chain alkyl or alkoxy groups with at most 6 carbon atoms.

The imidazoline derivatives of formula I have valuable therapeutics properties. They exert a strong diuretic activity and therefore may be used as diuretics in humans and animals. The compounds cause an increase in the Na/K ratio in the urine.

For use as therapeutics, the compounds of formula I may be used as such or as non-toxic acid addition or quaternary ammonium salts, i.e. salts which are not harmful to the animal organism when used in therapeutic doses. Such acid addition salts may be derived from inorganic acids, such as the hydrogen halides, e.g. hydrochloric and hydrobromic acid, and sulfuric acid, and organic acids such as oxalic, maleic, tartaric, citric, acetic, lactic, succinic and fumaric aids.

The bases, non-toxic acid addition or quaternary ammonium salts of formula I may be administered orally or parenterally in a pharmacologically acceptable carrier according to accepted pharmaceutical practice. The dosage and method of administration will depend on the species and the disease treated. In adult humans, the oral dosage is from 20 to 100 mg. daily.

According to a feature of the invention the imidazoline derivatives of formula I are prepared by reacting a compound of the formula

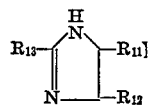

II wherein $R_{11}$, $R_{12}$ and $R_{13}$ are as hereinbefore defined, with a compound of the formula

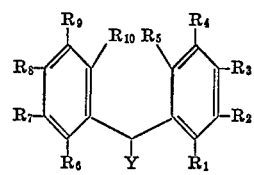

III wherein Y represents a halogen atom and the R symbols are as hereinbefore defined. The reaction is preferably carried out by heating the reactants in an inert organic solvent such as benzene, toluene, xylene or dioxane.

The reaction is preferably carried out in the presence of a base, which may suitably be an excess of the compound of formula II. However, other bases such as potassium carbonate or tertiary amines, e.g. triethylamine, may also be used.

According to another feature of the invention, compounds of formula I in which $R_5$ and $R_{10}$ together form a —CH=CH— group are prepared by reducing, by methods known per se, a corresponding compound in which $R_5$ and $R_{10}$ together form a group —CH=CHal—. The reduction is preferably carried out by catalytic hydrogenation, using a catalyst such as platinum or palladium, in the presence of a base, for example, sodium hydroxide or potassium hydroxide.

Another useful method of preparing the imidazoline derivatives of formula I involve reacting a salt of an ethylenediamine derivative of the formula

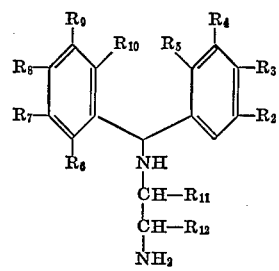

IV with a nitrile of the formula $$R_{13}CN \qquad V$$

Preferably a monosulfonate, e.g. toluene-p-sulfonate of the compound of formula IV is employed.

The reaction is preferably carried out by heating the reactants together at 80–200° C.

Acid addition and quaternary ammonium salts of the compounds of formula I may be prepared by methods known per se. For example, the base may be treated with the equivalent amount of the acid in an inert solvent to obtain the corresponding acid addition salt, or the base may be treated with the equivalent amount of an appropriate alkylating agent, e.g. an alkyl halide or dialkyl sulfate in a solvent with a high dielectric constant, for example acetonitrile, to obtain the quaternary ammonium salt.

By the term "methods known per se," as used in this specification, is meant methods heretofore used or described in the literature.

The following examples further illustrate the best mode currently contemplated for carrying out the present invention, but must not be construed as limiting the invention in any manner.

EXAMPLE 1

A solution of 23.0 g. (0.10 mol.) of 10,11-dihydro-5H-dibenzo[a,d]cyclohepten-5-yl chloride in 200 ml. of anhydrous toluene is added dropwise to a refluxing solution of 16.8 g. (0.20 mol.) of 2-methyl-2-imidazoline in 200 ml. of anhydrous toluene. When the addition is completed, the mixture is refluxed for another five minutes and then filtered The filtrate is concentrated and diethyl ether is added to the oily residue. The precipitate obtained is crystallized from petroleum ether (boiling range 100–140° C.).

1 - (10,11 - Dihydro - 5H - dibenzo[a,d]cyclohepten-5-yl)-2-methyl-2-imidazoline is obtained with melting point 121–123° C.

EXAMPLE 2

A solution of 11.9 g. (0.05 mol.) of 4,4'-difluorobenzhydryl chloride in 100 ml. of o-dichlorobenzene is added to a mixture of 8.4 g. (0.10 mol.) of 2-methyl-2-imidazoline and 75 ml. o-dichlorobenzene. The mixture is refluxed for 24 hours. The dark colored reaction mixture is extracted five times with water, after which the organic layer is extracted with 2N hydrochloric acid. The acid extract is extracted successively with diethyl ether and chloroform. The chloroform is evaporated and a 2N sodium hydroxide solution and diethyl ether are added to the residue. The ethereal layer is separated off and dried on sodium sulfate and the ether is evaporated. The solid substance obtained is washed with diethyl ether, cooled in a mixture of solid carbon dioxide and acetone.

1-[Bis(p-fluorphenyl)methyl]-2-methyl-2-imidazoline is obtained with a melting point of 128.5–129.5° C.

EXAMPLE 3

A solution of 13.2 g. (0.06 mol.) of p-chlorobenzhydryl chloride in 100 ml. of anhydrous toluene is added dropwise to a refluxing solution of 13.5 g. (0.12 mol.) of 2-ethyl-4-methylimidazoline in 100 ml. of anhydrous toluene. The mixture is then refluxed for 24 hours. The reaction mixture is extracted 5 times with water, after which the organic layer is extracted with 2N hydrochloric acid. The acid solution is extracted with diethyl ether and then made alkaline with a 2N sodium hydroxide solution. The basic layer is extracted with diethyl ether. The ether is evaporated and the residue is passed through a column of 1.25 m., filled with silicagel 0.05–0.2 mm. A mixture of 50 parts of ethanol, 50 parts of benzene and 1 part of ammonia and subsequently a mixture of 90 parts of petroleum ether (boiling range 100–140° C.) and 10 parts of diethylamine are used as the mobile phase. The solvents are evaporated and the identical fractions (according to the n.m.r. spectra) are combined. 1-(p-Chloro-α-phenylbenzyl)-2-ethyl-4-methyl-2-imidazoline is obtained as an oil.

EXAMPLE 4

A solution of 22.9 g. (0.10 mol.) of 10,11-dihydro-5H-dibenzo[a,d]cyclohepten-5-yl chloride in 100 ml. of anhydrous xylene is added dropwise to a refluxing mixture of 12.3 g. (0.11 mol.) of 2-ethyl-4-methylimidazoline, 29 g. (0.21 mol.) of potassium carbonate and 0.5 g. of potassium iodide in 150 ml. of anhydrous xylene. The mixture is refluxed for one hour and then cooled and extracted with water. The organic layer is dried over sodium sulfate, decolorized with active charcoal and concentrated by evaporation of solvent. Oxalic acid is added to the residue and the precipitate formed is filtered off and dissolved in hot water. After cooling, the solution is filtered and the filtrate is concentrated. Diethyl ether and a 5N sodium hydroxide solution are added to the residue. The ethereal layer is separated off and ethereal sulfuric acid is added. The precipitate is filtered off and crystallized from a mixture of ethanol and diethyl ether. 1-(10,11-Dihydro - 5H-dibenzo[a,d]cyclohepten-5-yl)-2-ethyl-4-methyl-2-imidazoline hydrogen sulfate is obtained with a melting point of 207–208° C.

EXAMPLE 5

A solution of 23.2 g. (0.1 mol.) of p-methoxybenzhydryl chloride in 150 ml. of o-dichlorobenzene is added dropwise to a refluxing solution of 16.8 g. (0.2 mol.) of 2-methyl-2-imidazoline in 100 ml. of o-dichlorobenzene. The mixture is refluxed for 3 hours. Then 50 ml. of water is added and the phases are separated and filtered. The organic phase is extracted with 100 ml. of 2 N hydrochloric acid. The acid aqueous abstract is made alkaline with potassium carbonate and extracted with diethyl ether. The extract is dried over sodium sulfate and the solvent is distilled off. The residue is dissolved in diethyl ether and an ethereal solution of oxalic acid is added on which an oily precipitate is formed, which is crystallized four times from a mixture of acetone and diethyl ether. The product is then dissolved in water and the solution is made alkaline with a 2 N sodium hydroxide solution and extracted with diethyl ether. The extract is dried over sodium sulfate and the ether is distilled off. 1-(p-Methoxy-α-phenylbenzyl)-2-methyl-2-imidazoline is obtained as an oil. The structure is confirmed by mass spectrum and NMR spectrum.

Among the diphenylmethyl imidazolines of this invention are those having the formula

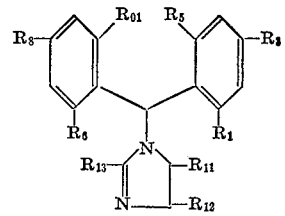

in which $R_1$, $R_3$, $R_6$, $R_8$, are the same or different and each represents hydrogen, halogen, lower alkyl or lower alkoxy, $R_{11}$, $R_{12}$ and $R_{13}$ are the same or different and each represents hydrogen or alkyl with at most 12 carbon atoms and $R_5$ and $R_{10}$ each represents hydrogen, halogen, lower alkyl or lower alkoxy; or the non-toxic acid addition or quaternary salt thereof.

The invention includes within its scope pharmaceutical preparations containing, as the active ingredient, at least one of the therapeutically active compounds of formula I, or non-toxic acid addition or quaternary ammonium salt thereof, in association with a pharmaceutically acceptable carrier. The preparations may take any of the forms customarily employed for the administration of therapeutic substances. Tablets and pills may be formulated in the usual manner with one or more pharmaceutically acceptable diluents or excipients, for example, lactose or starch. They may include materials of a lubricating nature, for example, calcium or magnesium stearate. Capsules made of absorbable material, such as gelatin, may contain the active substance alone or in admixture with a solid or liquid diluent. Liquid preparations may be in the form of suspensions, emulsions, syrups or elixirs of the active substance in water or other liquid medium commonly used for making orally acceptable pharmaceutical formulations, such as liquid paraffin, or a syrup or elixir base. The active substance may also be made up in a form suitable for parenteral administration, i.e. as a suspension or emulsion in sterile water or an organic liquid usually employed for injectable preparations, for example, a vegetable oil such as olive oil, or a sterile solution in water or an organic solvent.

The following example illustrates pharmaceutical compositions according to the invention.

EXAMPLE 6

Fifty g. of 1-(10,11-dihydro-5H-dibenzo[a,d]cyclohepten-5-yl)-2-methyl-2-imidazoline (sieved through a 40-mesh sieve), 50 g. of Avicel PH 101 (microcrystalline cellulose) and 1 g. of Aerosil (highly purified silicon dioxide) are mixed together and gelatin capsules are filled each with 101 mg. of the mixture so that each capsule contains 50 mg. of active substance.

The imidazoline compounds of the present invention have been tested for diuretic activity using a method based on that of R. Aston, Toxicol, Appl. Pharmacol. 1, 277 (1959) as modified by H. Herstel et al., Arzneim.-Forsch. (Drug. Res.) 18, 827 (1968).

EXAMPLE 7

Diuretic Test

Male albino rats (TNO-WU-strain SPF) with weights ranging from 100–200 grams were placed in separate cages in a room of constant temperature (28° C.) and relative humidity (ca. 50%). During the experiment, the rats received no food.

At the start of the experiment 50 ml./kg. of distilled water was administered by gastric tube and after 18 hours, 30 ml./kg. by the same route. Three hours later, the animals received 50 ml./kg. of saline (0.9%) and the test substance suspended in 5 ml./kg. of 1% amylum solution, also by gastric tube. Per dose level, 4 rats were used. The control groups, consisting of 4 or 8 rats, received amylum only. After 4 hours, the total urinary output was measured and expressed in ml./kg./4 hours.

Total amounts of sodium and potassium were determined by flame photometry and expressed in milliequivalents/kg.

The results are shown in Table 1. In Table I, the letters A–D represent the following compounds of the invention:

A. 1[Bis(p-fluorphenyl)methyl]-2-methyl-2-imidazoline;
B. 1-(10,11-Dihydro-5H-dibenzo[a,d]cyclohepten-5-yl)-2-ethyl-4-methyl-2-imidazoline hydrogen sulfate;
C. 1-(10,11-Dihydro-5H-dibenzo[a,d]cyclohepten-5-yl)-2-methyl-2-imidazoline;
D. 1-(p-Chloro-α-phenylbenzyl)-2-ethyl-4-methyl-2-imidazoline;

Compound E is a reference compound, furosemide, i.e., 4-Chloro-N-furfuryl-5-sulfamoyl anthranilic acid (sold under the trademark Lasix).

TABLE 1

| Compound | Dose, mg./kg. | Urne, ml./kg. | Na, meq./kg. | K, meq./kg. | Na/K |
|---|---|---|---|---|---|
| A | 2.85 | 36.3 | 3.33 | 0.78 | 4 |
|   | 5.6 | 45.8 | 5.79 | 1.01 | 6 |
|   | 11.5 | 55.5 | 6.16 | 1.04 | 6 |
|   | 23.0 | 64.8 | 7.36 | 1.23 | 6 |
|   | 45.5 | 71.4 | 7.98 | 0.95 | 8 |
|   | 0 | 21.8 | 1.58 | 0.58 | 3 |
| B | 32 | 64.3 | | | |
|   | 0 | 22.0 | | | |
| C | 22 | 64.3 | | | |
|   | 0 | 22.0 | | | |
| D | 25 | 77.1 | | | |
|   | 0 | 22.2 | | | |
| E (reference) | 16 | 18.8 | | | |
|   | 32 | 36.9 | | | |
|   | 64 | 65.0 | | | |
|   | 0 | 15 | | | |

As shown by the test results in Table 1, the compounds of the invention have effective diuretic action in very low dosages and compare favorably with the reference compound, furosemide, in diuretic activity. Moreover, the present imidazolines have a desirable effect on the Na/K ratio, i.e. a constant or decreasing Na/K ratio means a larger potassium deficiency.

What I claim as new and desire to secure by Letters Patent is:

1. An imidazoline derivative of the formula

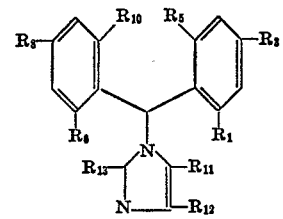

in which $R_1$, $R_3$, $R_6$, $R_8$ are the same or different and each represents hydrogen, halogen, lower alkyl or lower alkoxy, $R_{11}$, $R_{12}$ and $R_{13}$ are the same or different and each represents hydrogen or alkyl with at most 12 carbon atoms and $R_5$ and $R_{10}$ each represent hydrogen, halogen, lower alkyl or lower alkoxy; or a non-toxic acid addition or a non-toxic quaternary salt thereof.

2. An imidazoline derivative according to claim 1 which is 1-[bis(p-fluorophenyl)methyl]-2-methyl - 2 - imidazoline or its non-toxic acid addition or quaternary ammonium salt.

3. An imidazoline derivative according to claim 1 which is 1-(p-chloro-α-phenylbenzyl)-2-ethyl - 4 - methyl-2-imidazoline or its non-toxic acid addition or quaternary ammonium salt.

References Cited

UNITED STATES PATENTS

| | | | |
|---|---|---|---|
| 3,530,183 | 9/1970 | Kyburz et al. | 260—309.6 |
| 3,471,485 | 10/1969 | Trepanier | 424—249 |
| 2,847,417 | 8/1958 | Erner | 260—309.6 |
| 2,981,738 | 4/1961 | Kranz | 260—309.6 |
| 2,899,441 | 8/1959 | Dornfeld | 260—309.6 |

OTHER REFERENCES

Cavallini, Chem. Abst., vol. 41, column 6989 (1947). QD1.A51.

Klosa, Chem. Abst., vol. 51, column 5759 (1957). QD1.A51.

NATALIE TROUSOF, Primary Examiner

U.S. Cl. X.R.

260—570 D, 570.5 P; 424—273